(12) United States Patent
Valentini (10) Patent No.: US 7,000,287 B2
(45) Date of Patent: Feb. 21, 2006

(54) PORTABLE CONTAINMENT AND TRANSPORT EQUIPMENT WITH DUST SUCTION AND COLLECTION CAPACITY

(76) Inventor: Guido Valentini, Via Gioberti, 2, Milano (IT) 20132

(*) Notice: Subject to any disclaimer, the term of this patent is extended or adjusted under 35 U.S.C. 154(b) by 375 days.

(21) Appl. No.: 10/321,820

(22) Filed: Dec. 17, 2002

(65) Prior Publication Data

US 2003/0115715 A1    Jun. 26, 2003

(30) Foreign Application Priority Data

Dec. 21, 2001 (IT) .......................... MI2001U0676
Jun. 5, 2002 (IT) .......................... MI2002U0293

(51) Int. Cl.
*A47L 7/00* (2006.01)

(52) U.S. Cl. .......................... 15/323; 15/327.2; 15/339; 15/347

(58) Field of Classification Search .................. 15/323, 15/339, 344, 347, 321.1, 327.2; 206/576
See application file for complete search history.

(56) References Cited

U.S. PATENT DOCUMENTS

| | | | |
|---|---|---|---|
| 3,328,826 A | | 7/1967 | Amos |
| 3,977,037 A | * | 8/1976 | Miyake et al. ................ 15/323 |
| 4,729,147 A | * | 3/1988 | Armbruster .................. 15/323 |
| 5,095,579 A | | 3/1992 | Becker |
| 6,611,989 B1 | * | 9/2003 | Oh et al. ...................... 15/323 |

FOREIGN PATENT DOCUMENTS

| | | |
|---|---|---|
| DE | 100 63 022 | 6/2002 |
| EP | 0 281 129 | 9/1988 |
| EP | 0 371 236 | 6/1990 |
| EP | 0 377 100 | 11/1990 |
| EP | 0 916 302 | 5/1999 |
| GB | 2 324 713 | 11/1998 |
| GB | 2330521 | 4/1999 |
| JP | 61-193623 | 8/1986 |
| JP | 10337680 | 12/1998 |

\* cited by examiner

*Primary Examiner*—Theresa T. Snider
(74) *Attorney, Agent, or Firm*—Arnold B. Silverman; William F. Lang, IV; Eckert Seamans Cherin & Mellott, LLC (57) ABSTRACT

A portable equipment for electric tool for the working of surfaces includes a case-shaped container (1) including a plurality of compartments. A first compartment (40, 60) houses air suction device (16, 66), a second compartment (14, 70) is provided with an openable cover (26, 72) and houses filtering device (30, 81) and replaceable device (15, 71) for the collection of working dust contained in the sucked air and a third compartment (5, 90) is provided with an openable cover (6, 91) and is suitable for housing an electric tool and its accessories. The case-shaped container (1) is also provided with first connecting device (4, 3; 55, 56) for electrical and suction connection of the container (1) to the tool and with second connecting device (28, 12; 78, 62) for electrical connection of the container (1) to a power supply. The case-shaped container (1) can consist of a single body or can be made of distinct first and second case-shaped bodies (51, 99), the first body (51) being divided into the first and second compartments (60, 70) and being provided with the first (55, 56) and second (78, 62) connecting device the second body (99) including the third compartment (90); there are provided device (93, 94) for coupling and uncoupling the bodies (51, 99).

6 Claims, 10 Drawing Sheets

PORTABLE CONTAINMENT AND TRANSPORT EQUIPMENT WITH DUST SUCTION AND COLLECTION CAPACITY

BACKGROUND OF THE INVENTION

The present invention concerns a portable containment and transport equipment with dust suction and collection capacity.

Portable containers are known for the transport of electric tools for the working of surfaces, such as sanders, abrasive grinders, drills or other electric tools.

In addition suction equipments are also known which are connectable to the aforesaid tools for the suction of the working dusts that they produce.

SUMMARY OF THE INVENTION

Object of the present invention is to provide a portable equipment that accomplishes the double function of containment and transport and of suction and collection of the working dust.

According to the present invention, such object is attained by means of a portable equipment characterized in that it comprises a case-shaped container including a plurality of compartments, a first compartment which houses air suction means, a second compartment which is provided with an openable cover and houses filtering means and replaceable means for the collection of working dust contained in the sucked air and third compartment which is separated from said first and second compartments and is provided with an openable cover, the case-shaped container being also provided with first connecting means for electrical and suction connection of the container to an electric tool and with second connecting means for electrical connection of the container to a power supply.

Owing to the present invention it is possible to provide a portable equipment that is capable in the use, to be electrically connected to an electric tool for the working of surfaces, while at the same time sucking and collecting working dusts.

According to an embodiment of the present invention the case-shaped container is made of a single body including said first, second and third compartments.

According to another embodiment the case-shaped container is made of distinct first and second case-shaped bodies, said first body being divided into said first and second compartments and being provided with said first and second connecting means, said second body including said third compartment, there being provided means for coupling and uncoupling said bodies.

A portable equipment for the working of surfaces is thus obtained, which may be separated into a suction case and a carrying case for the transport of an electric tool and accessories, that is into two cases completely independent from one another, as regards both transport and operation.

The characteristics and the advantages of the present invention will become evident from the following detailed description of two embodiments thereof, that are illustrated as non-limiting examples in the enclosed drawings, in which:

DETAILED DESCRIPTION OF THE PREFERRED EMBODIMENT

Figure 1:
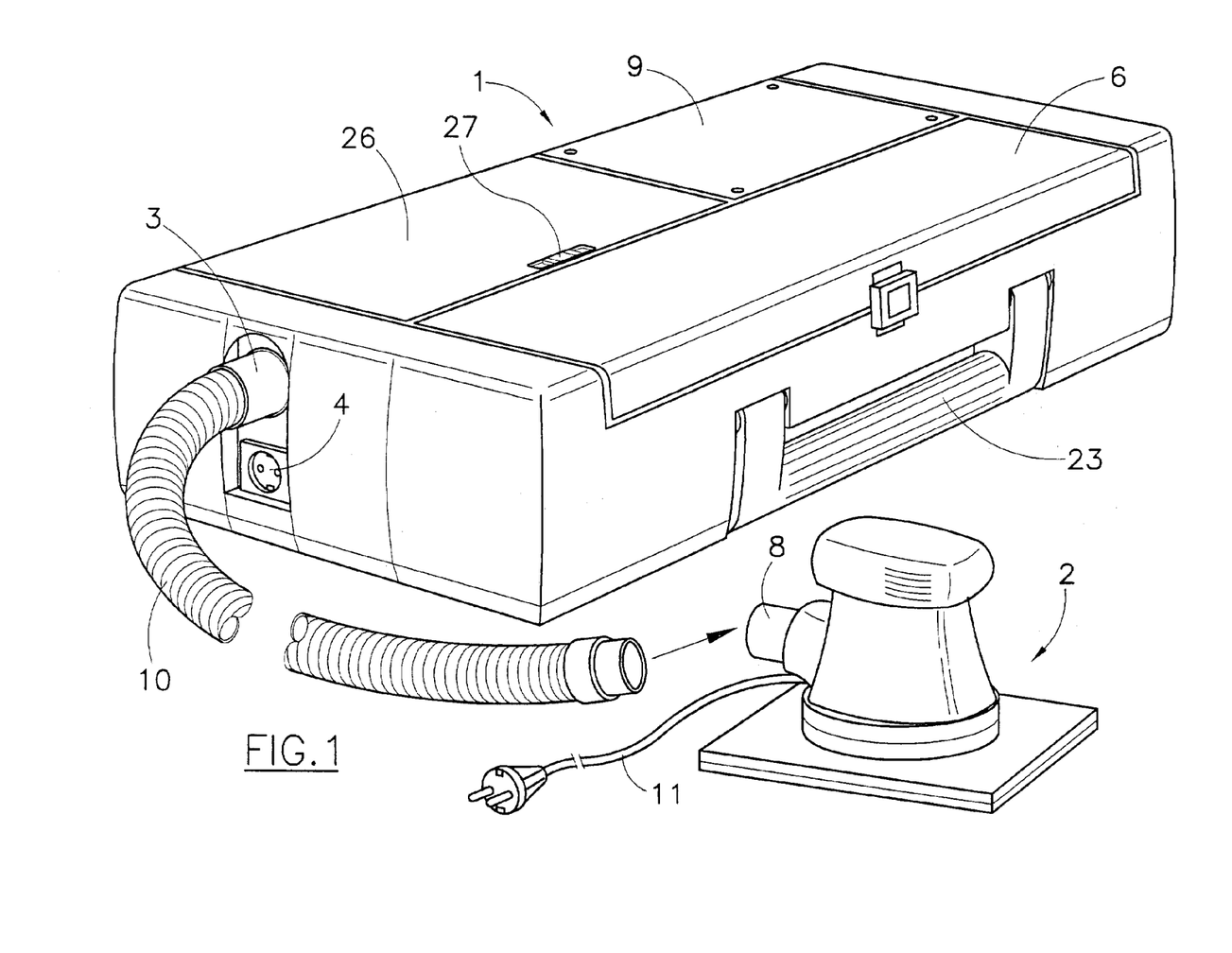
FIG. 1 shows a perspective view of a first embodiment of the equipment according to the invention.

With reference to the FIGS. 1–6 and in particular to FIG. 1, a first embodiment of the portable equipment according to the invention is shown comprising a container 1, shaped as a carrying case, to which a tool 2 of the electric type for the working of surfaces can be connected.

Figure 4:
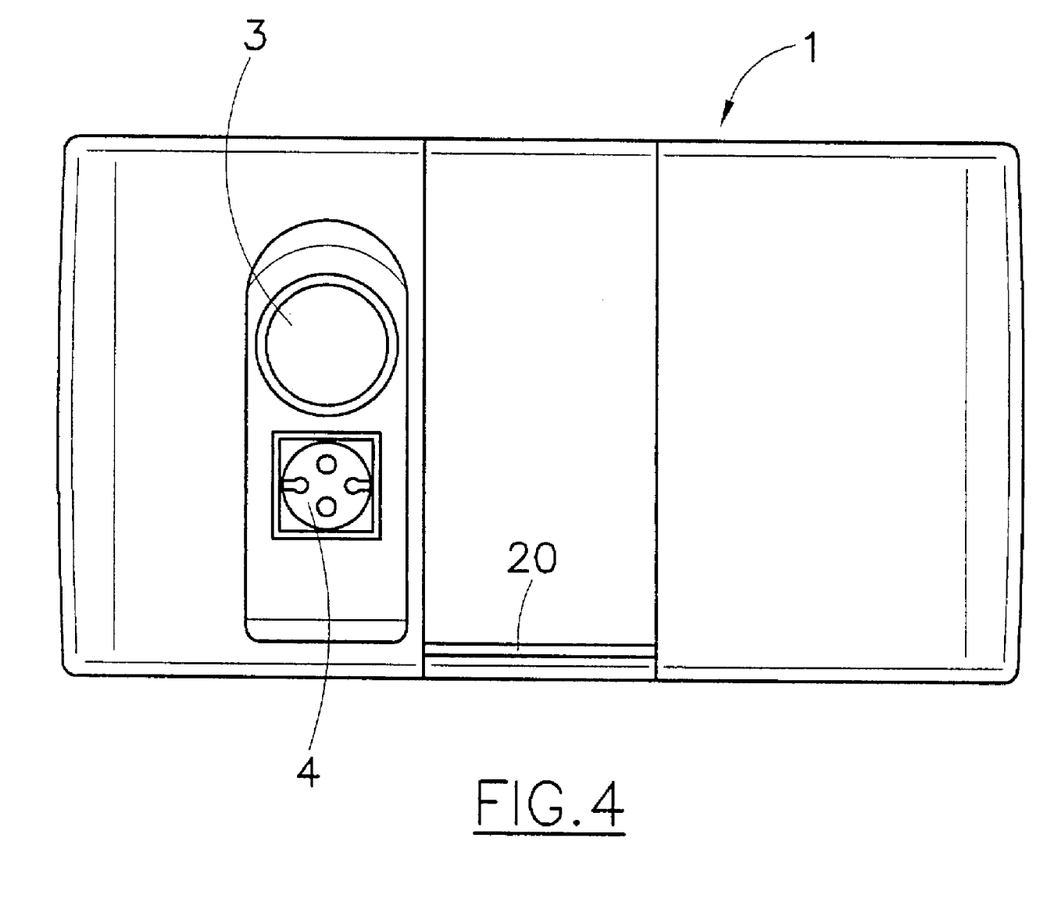
FIG. 4 shows a left-hand view of the embodiment of FIG. 1.

The container 1 provides on a front side, also shown in FIG. 4, a suction mouth 3 and a power socket 4.

To the suction mouth 3 a hose 10 is connectable that is in turn connectable with a dust suction mouth 8 of the tool 2, whereas with the electric socket 4 a cable 11 for the power supply of the same tool is connectable.

Figure 2:
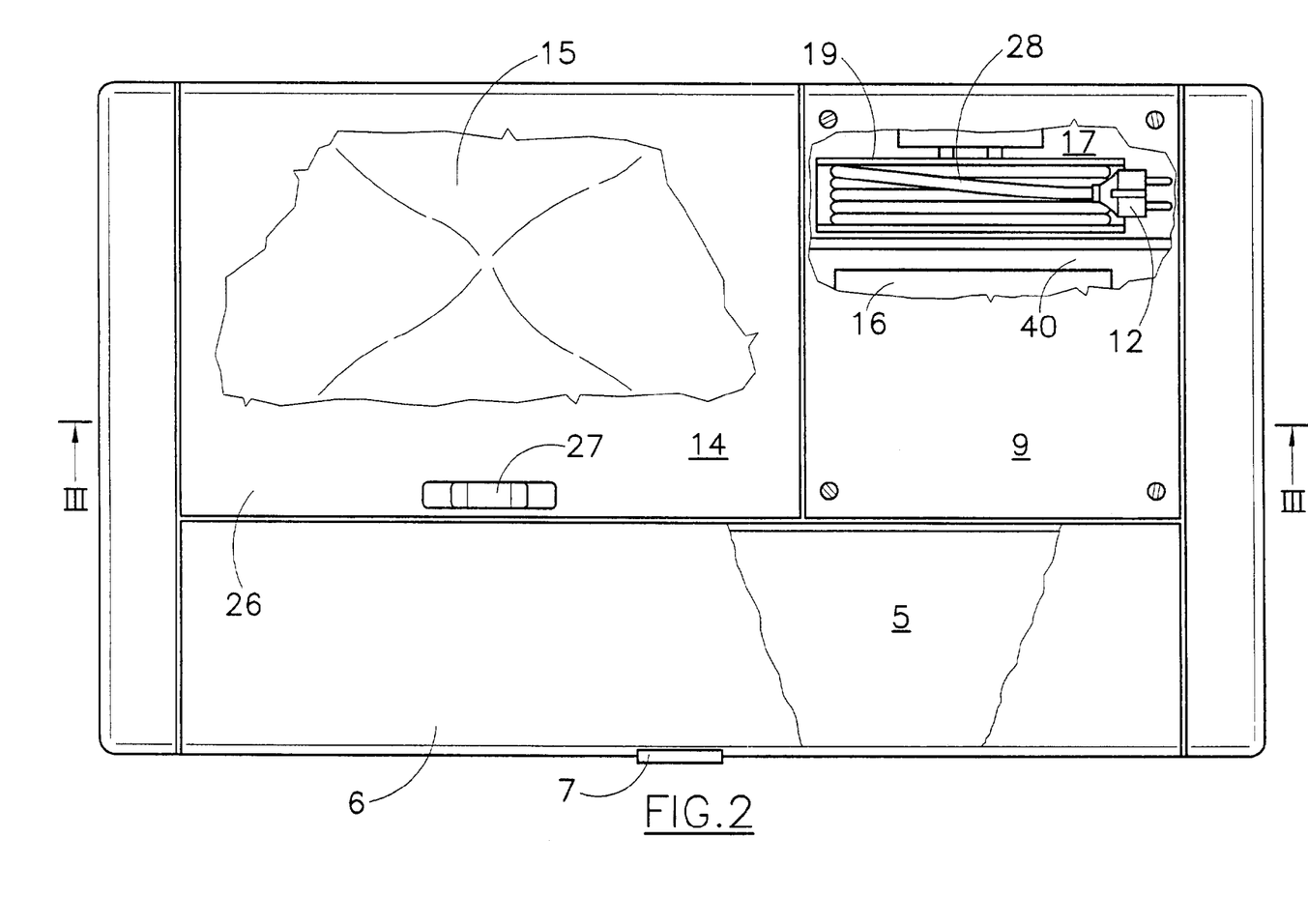
FIG. 2 shows a top plan view of the embodiment in FIG. 1.
Figure 3:
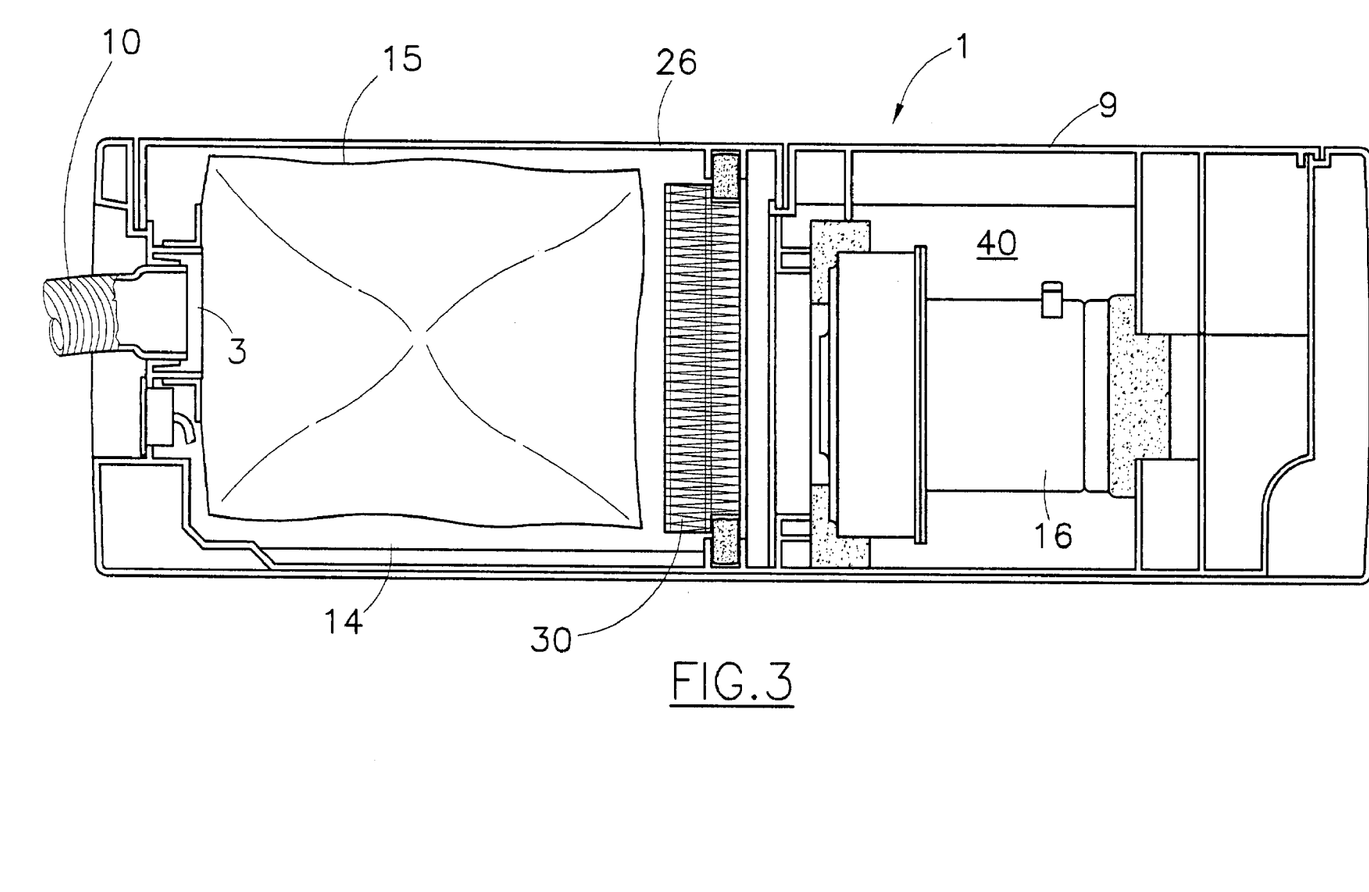
FIG. 3 shows a section view according to the line III—III of FIG. 2.

On its inside, as it can be noticed in FIGS. 2 and 3, the container 1 is subdivided into a plurality of compartments, identified by the reference numbers 40, 14, 5 and 17.

A first compartment 40, closed by a cover 9, houses an electric aspirator 16, as well as an appropriate electronic control card (not shown). A second compartment 14, closed by a cover 26 which can be opened by operation of a button 27 (FIGS. 1 and 2), communicates with the compartment 40 and houses a bag 15 for the collection of the dust contained in the air intaken by the aspirator 16 through the suction mouth 3 and a filter 30 located at the inlet of the aspirator 16. A third compartment 5, separated from the first and second compartments and closed by a cover 6 which can be opened by operation of a button 7, is suitable for the housing of devices and accessories. A fourth compartment 17, closed by cover 9 too, finally houses a cable reel 19 for the winding, at rest, of an electric cable 28 provided with a plug 12, that when in extracted condition provides for the power connection of the equipment with an usual power supply.

An additional compartment closed by a cover could be provided, if desirable, under the bottom plane of the container 1.

Figure 5:
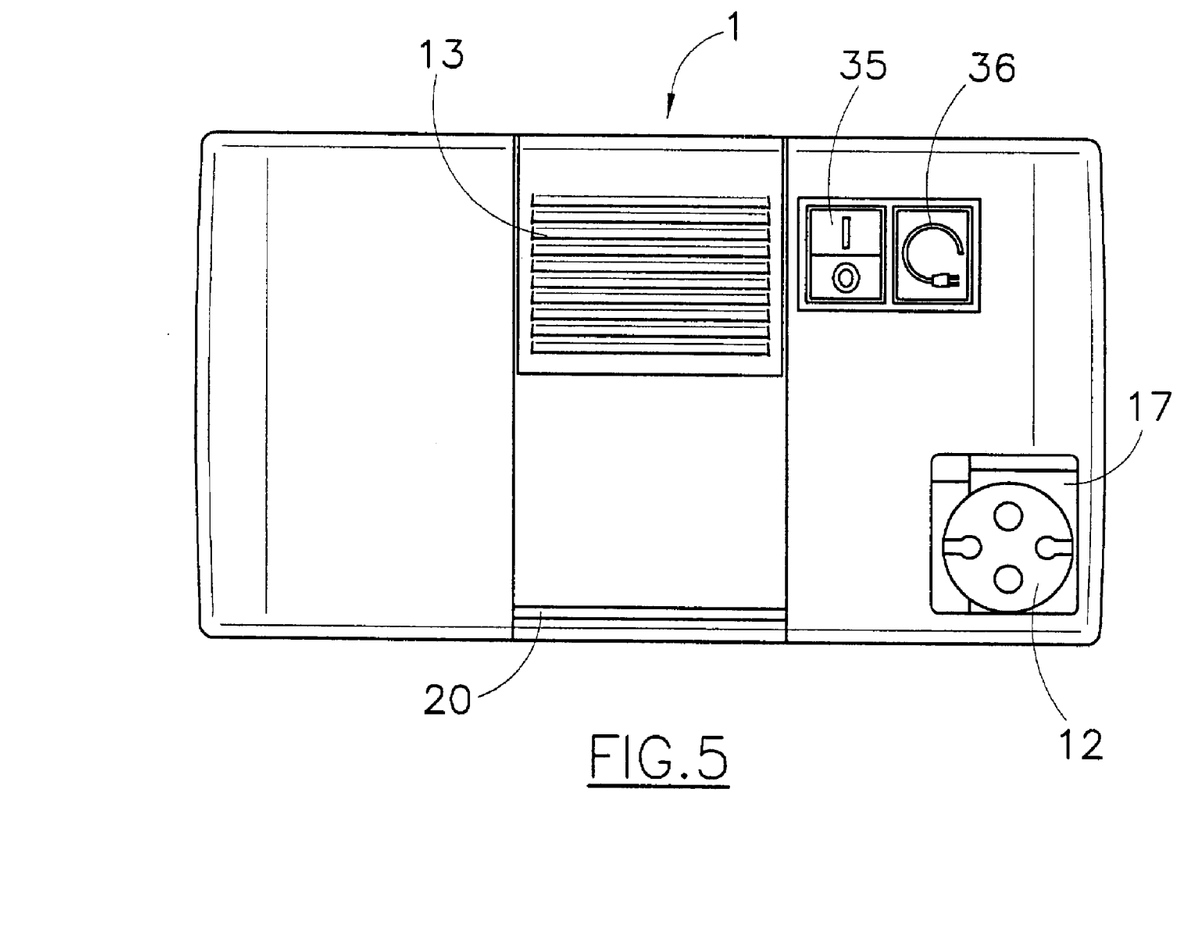
FIG. 5 shows a right-hand view of the embodiment of FIG. 1.
Figure 6:
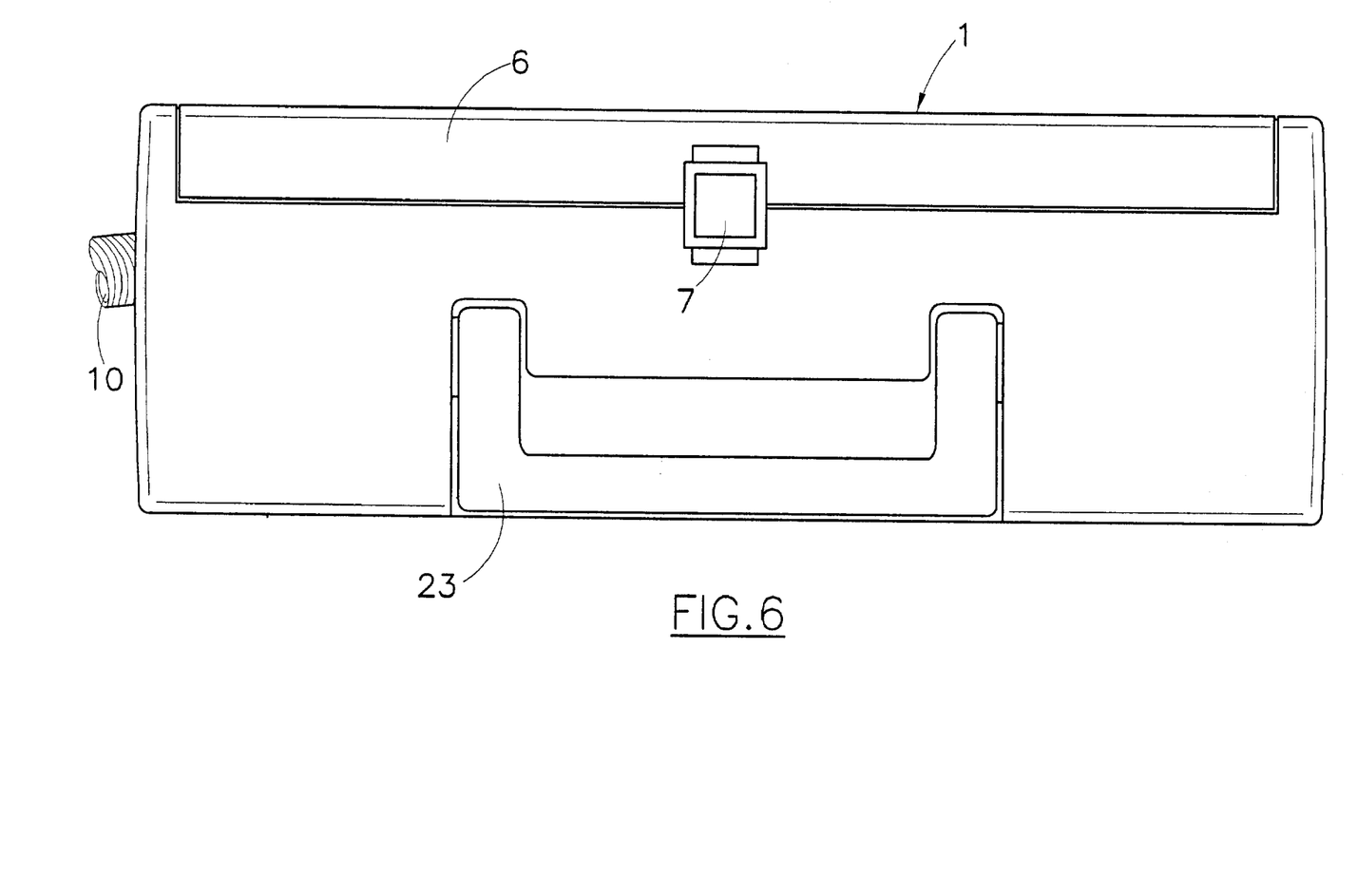
FIG. 6 shows a side view of the embodiment of FIG. 1.
Figure 7:
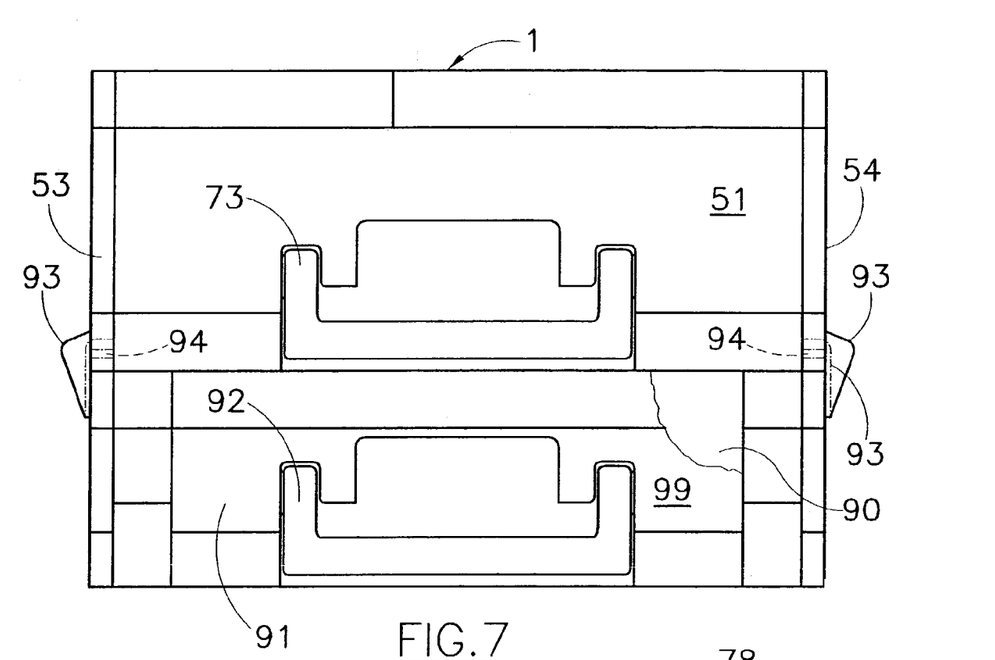
FIG. 7 shows a front view of a second embodiment of the equipment according to the invention, which is formed by two distinct bodies coupled together.

On the back side, opposite to the one of FIG. 4 and shown in FIG. 5, the container 1 provides, in addition to the outlet of the compartment 17, an airing grid 13 for the aspirator 16, a switch 35 to turn the equipment on and off and a button 36 for the control of the winding of the electric cable 28. The same Figure shows also a cross-member 20, that can be hooked by an appropriate hook below it in order to secure the container onto an underlying support, that can be a carriage or another carrying case of similar shape onto which the container 1 is stackable. A similar cross-member 20 is present also on the front of the container (FIG. 4).

Finally, on one side of the container 1 (FIGS. 1 and 6) a foldable handle 23 that can be used for the transport of container 1 is provided.

Wheels can be provided for the transport of the container 1 and/or its movement during working.

Coming now to FIGS. 7–10, a second embodiment is shown in which the case-shaped container 1 is formed by two distinct case-shaped bodies 51 and 99 superimposed on one another and coupled together.

A first body 51 consists of a suction device which can be connected to a portable electric tool for the working of surfaces. The first body 51 is provided on one side 53, shown in FIG. 9, with a suction mouth 56 which can be connected by means of a hose with a dust suction duct provided in the portable tool.

On the same side 53 a power socket 55 is present to which a cable for the power supply of the same tool is connectable.

Figure 8:
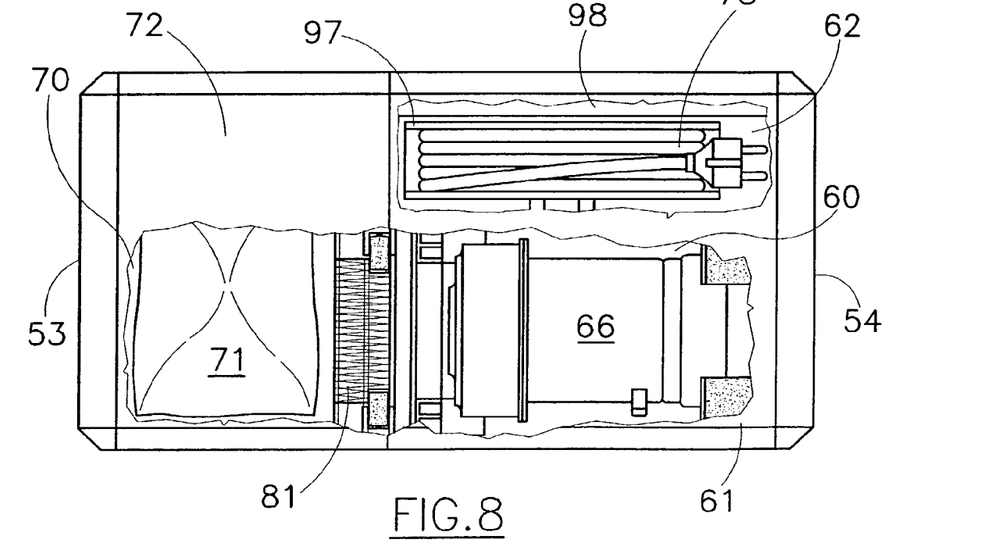
FIG. 8 shows a top plan view, partially sectioned, of the embodiment in FIG. 7.
Figure 9:
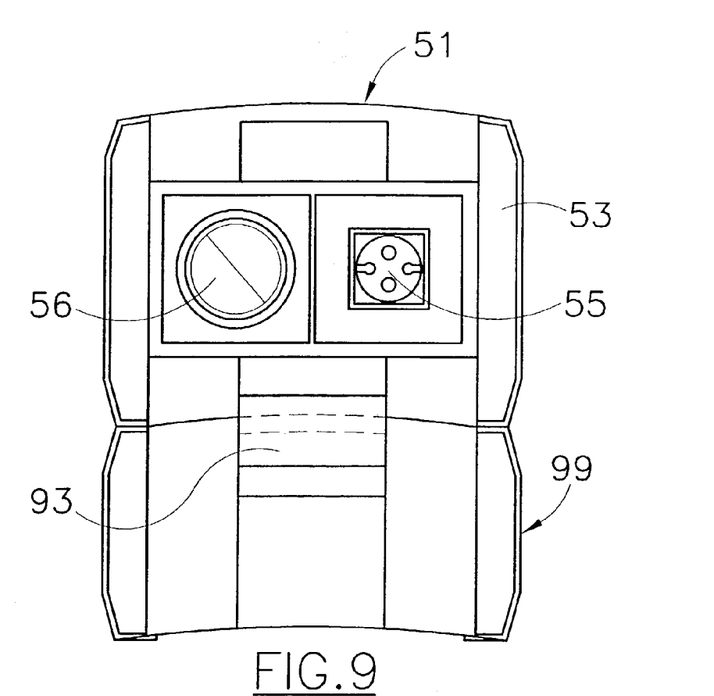
FIG. 9 is a left side view of the embodiment of FIG. 7.

As it can be noticed in FIG. 8, the first body 51 is divided into two compartments, identified by the reference numbers 60 and 70.

A first compartment 60, closed by a cover 61, houses an electric aspirator 66, as well as an appropriate electronic control card (not shown).

A second compartment 70, closed by a cover 72 openable from the outside, communicates with the compartment 60 and houses a bag 71 for the collection of the dust contained in the air intaken by the aspirator 66 through the suction mouth 56 and a filter 81 positioned at the inlet of the aspirator 66.

Close to the compartment 60 a space 98 is provided, in which a cable reel 97 is housed for the winding, at rest, of an electric cable 78 provided with a plug 62, that when in extracted condition provides for the electrical connection of the aspirator 66 with a normal power supply.

Figure 10:
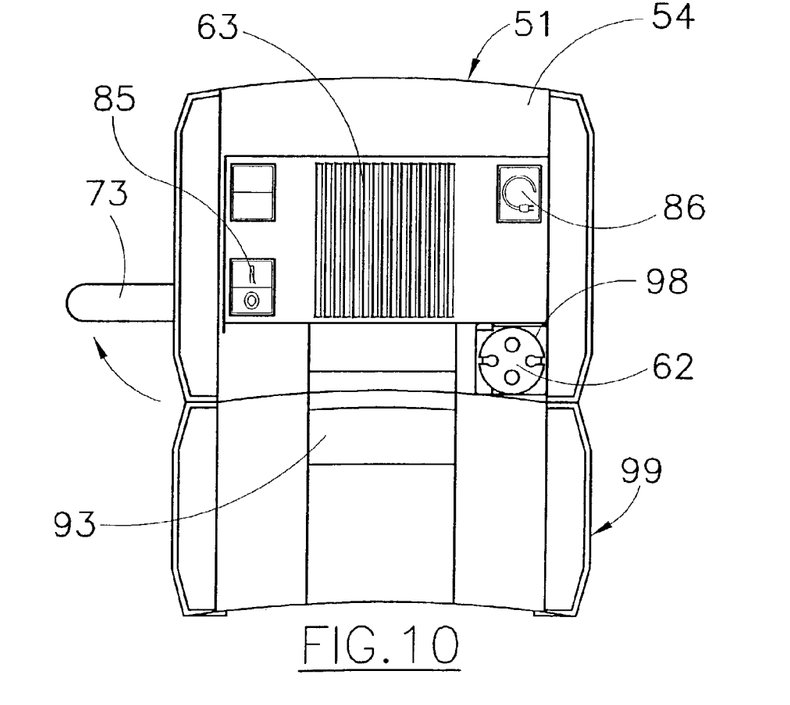
FIG. 10 is a right side view of the embodiment in FIG. 7.

On the back side 54, opposite to the side 53 and shown in FIG. 10, the first body 51 has an airing grid 63 for the aspirator 66, a switch 85 for turning the equipment on and off and a button 86 for the control of the winding of the electric cable 78.

Finally, on the front part of the first body 51 (FIG. 7) an extractable and foldable handle 73 is provided, normally embedded in the container, that can be rotated toward the outside (FIG. 10) and used for the transport of the same body.

A second body 99 includes a third compartment 90 suitable to the housing of an electric tool for the working of surfaces (for instance a sanding machine), as well as of other devices and accessories, when not in use and during the transport stage. Said compartment is closed by a door 91 and it is provided with an extractable and foldable handle 92 for its transport.

The two bodies 51 and 99 can be superimposed and hooked to each other (body 51 on body 99) so as to form a single portable electric equipment comprising an extractable working tool with relative accessories and a suction unit. Coupling means of any type useful to such scope provide to their coupling, for instance small levers 93 that are sliding and turnable between the uncoupled position shown as a solid line in FIG. 7 and the coupled position, in engagement with side bars 94 of the adjacent body, that it is shown in dot and line in FIG. 7.

Figure 11:
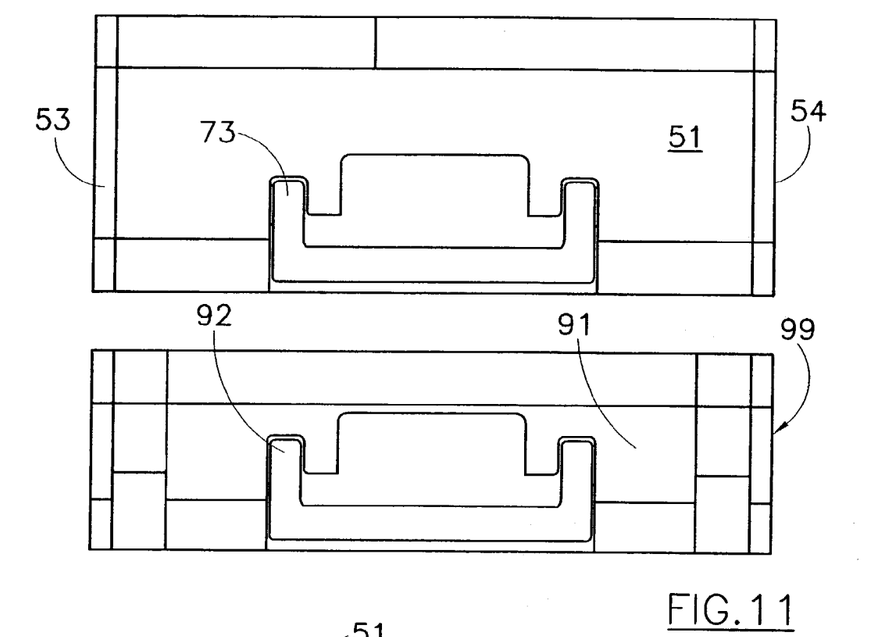
FIG. 11 is a view similar to the one in FIG. 7 with the two bodies uncoupled and separate from each other.
Figure 12:
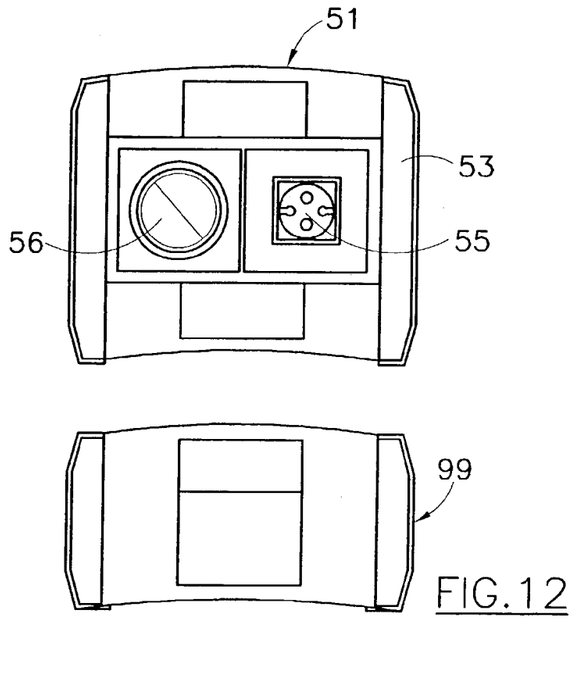
FIG. 12 is a view similar to the one in FIG. 9 with the two bodies uncoupled and separate from each other.
Figure 13:
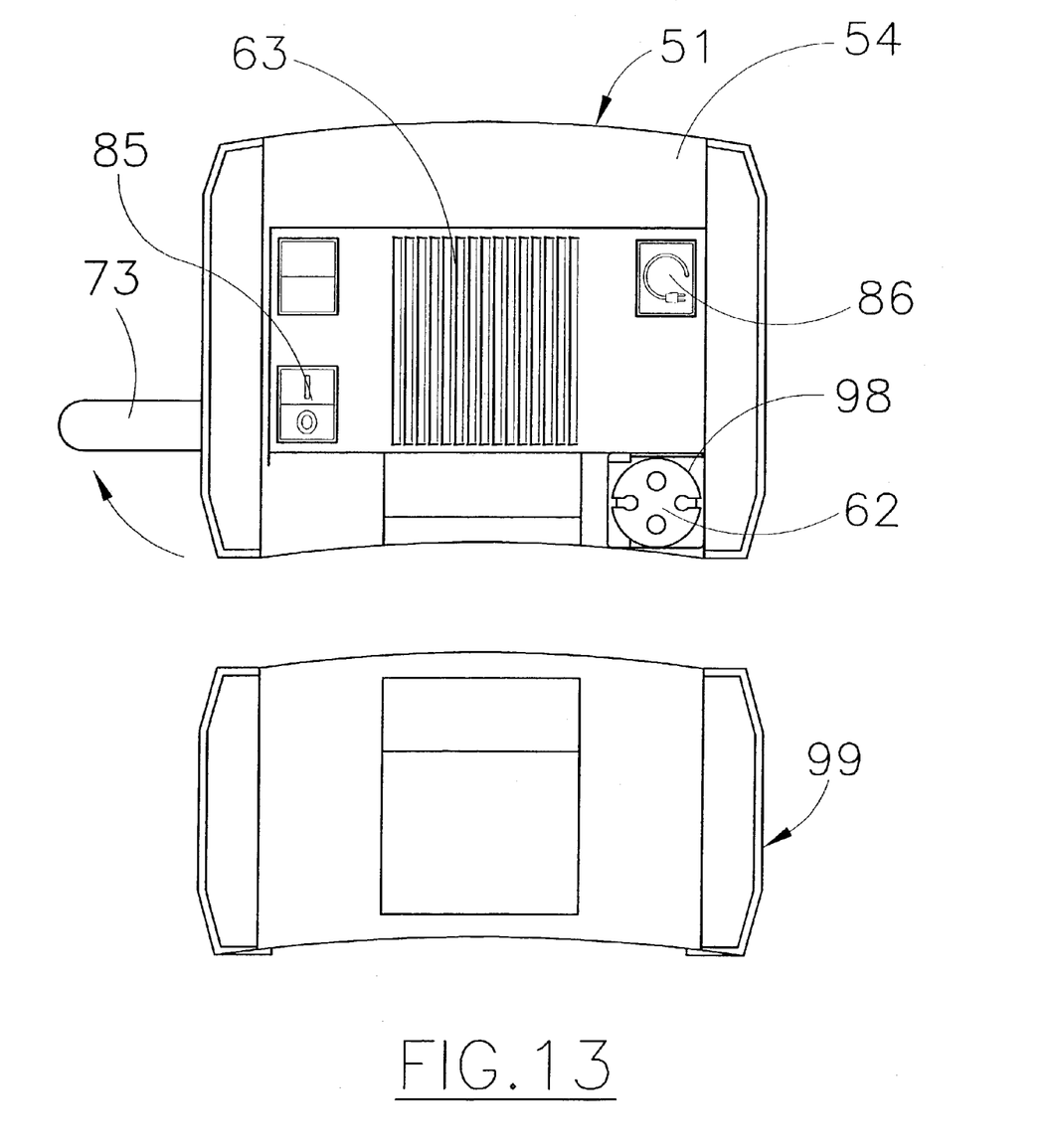
FIG. 13 is a view similar to the one in FIG. 10 with the two bodies uncoupled and separate from each other.

When the aforesaid coupling means are in uncoupled position, the two bodies 51 and 99 are separate from each other, as shown in FIGS. 11, 12 and 13, so that they become transportable and usable in separate and independent way, the first one as suction case and the second one as carrying case for the housing and the transport of an electric working tool and the relative accessories.

What is claimed is:

1. Portable containment and transport equipment with dust suction and collection capacity for surface working electric tool, characterised in that it comprises a case-shaped container including a plurality of compartments, a first compartment which is provided with an openable cover and which houses means for air suction, a second compartment which is provided with an openable cover and houses means for filtering and replaceable means for the collection of working dust contained in air sucked therethrough and a third compartment which is separated from said first and second compartments and is provided with an openable cover, the case-shaped container being also provided with first connecting means for electrical and suction connection of the container to an electric tool and with second connecting means for electrical connection of the container to a power supply, wherein said case-shaped container is made of a single body having said first, second and third compartments arranged laterally adjacent to each other with the respective covers placed on the same side of the container.

2. Equipment according to claim 1, wherein said first connecting means include an electric socket and a suction mouth.

3. Equipment according to claim 1, further comprising a switch to turn said suction means on and off.

4. Equipment according to claim 1, wherein said second connecting means comprise a retractable power supply cable with electric plug, rewindable on a reel controlled by a button.

5. Equipment according to claim 4, wherein said reel is housed in a fourth compartment integral with and communicating with said first compartment.

6. Equipment according to claim 1, wherein said container is provided with means for securing said container in a stacked position with another container.

* * * * *

UNITED STATES PATENT AND TRADEMARK OFFICE
CERTIFICATE OF CORRECTION

PATENT NO. : 7,000,287 B2 Page 1 of 1
APPLICATION NO. : 10/321820
DATED : February 21, 2006
INVENTOR(S) : Guido Valentini

It is certified that error appears in the above-identified patent and that said Letters Patent is hereby corrected as shown below:

Title Page, Item (57), Abstract, line 19, after "connecting device", insert --,--.

Abstract line 22, after "(51,99).", insert --(Figure 1)--.

Signed and Sealed this

Twenty-fifth Day of July, 2006

JON W. DUDAS
*Director of the United States Patent and Trademark Office*